Feb. 21, 1967             D. VAN WAGENEN             3,305,381
THIN LOAD SUPPORTING POLYURETHANE FOAM
AND METHOD OF MAKING SAME
Filed April 11, 1963                                2 Sheets-Sheet 1

INVENTOR
Donald Van Wagenen
BY McCoy, Greene, Medert,
& Te Grotenhuis
ATTORNEYS

Feb. 21, 1967 D. VAN WAGENEN 3,305,381
THIN LOAD SUPPORTING POLYURETHANE FOAM
AND METHOD OF MAKING SAME
Filed April 11, 1963 2 Sheets-Sheet 2
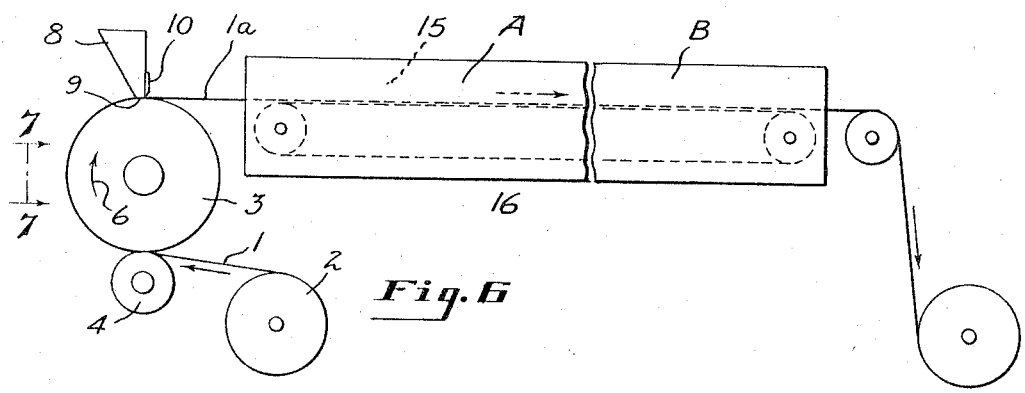
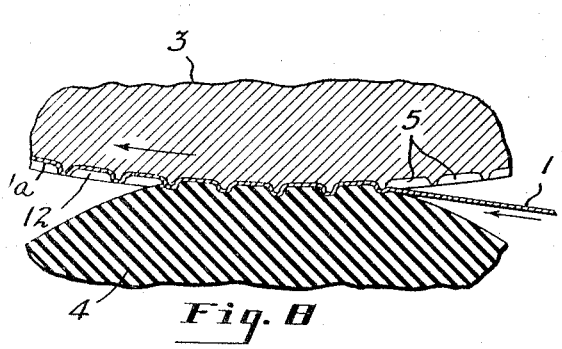
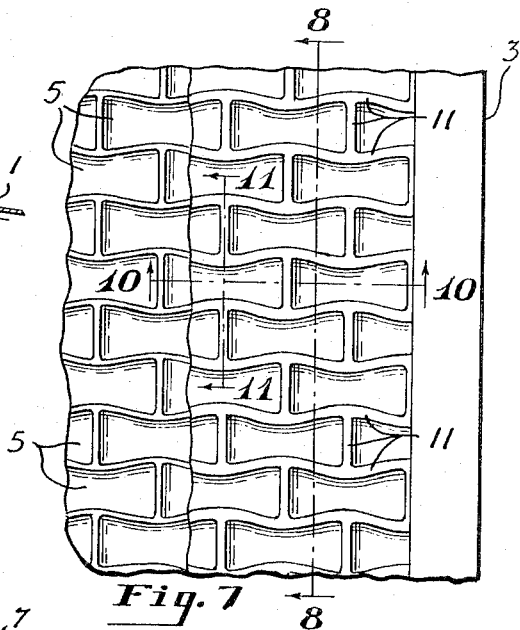
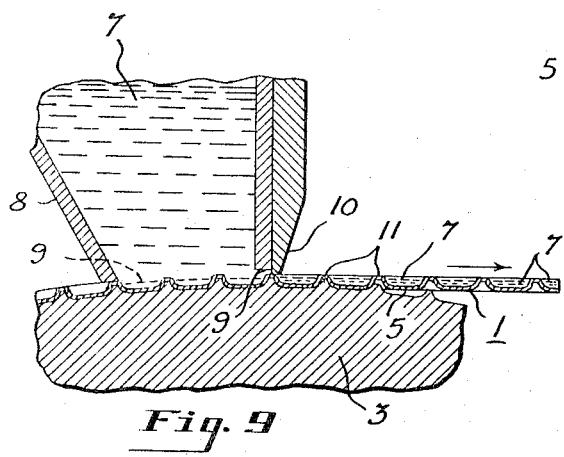
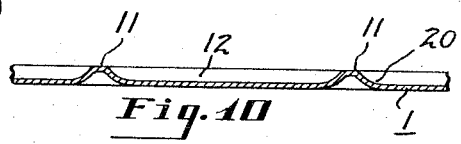
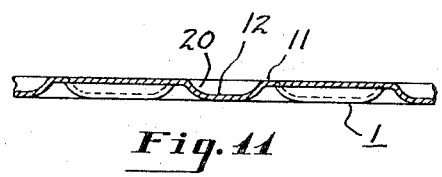
INVENTOR
Donald VanWagenen
BY McCoy, Greene, Medert,
& Le Grotenhuis
ATTORNEYS

United States Patent Office 3,305,381
Patented Feb. 21, 1967

3,305,381
THIN LOAD SUPPORTING POLYURETHANE
FOAM AND METHOD OF MAKING SAME
Donald Van Wagenen, Alliance, Ohio, assignor to The
General Tire & Rubber Company, Akron, Ohio, a corporation of Ohio
Filed Apr. 11, 1963, Ser. No. 272,338
7 Claims. (Cl. 117—8)

The present invention relates to the method of making polyurethane foam articles having varying but controlled thickness and having a relatively heavy protective, relatively solid outer layer of skin thereon. It particularly relates to a composite cushioning material suitable to be disposed undereath rugs, carpets and the like and having a flexible backing and a load supporting member which comprises both a polyurethane foam of varying but controlled thickness and a thick skin having portions shaped in archlike form.

Load supporting polyurethane foams are usually made by bringing together an organic polyol, an excess of polyisocyanate, a catalyst and a very small amount of water. The water reacts with part of the isocyanate to form urea like linkages and evolve $CO_2$, which causes foaming of the polyurethane formed by reaction of the polyol and the isocyanate. Since the $CO_2$ is easily lost from the upper surface of the liquid material, a skin is formed over the upper surface. This skin can even approach in weight the weight of the foam in thick foams and may constitute substantially the entire material when an attempt is made to make thin sections. It has been removed and discarded as waste and has been considered to be a great economic loss.

Several processes have been proposed in the art for producing thin sections of polyurethane foam suitable for heat insulation of clothing, etc. Such processes have had as their general objects the production of thin sections of polyurethane which are devoid of any skin or coating of unfrothed urethane. Such materials have been prepared by sandwiching conventional foam-forming formulations comprising a polyol and a polyisocyanate between two non-porous sheets which prevent loss of $CO_2$. The sheets may be coated with a suitable release agent. When the sheets are stripped, the resulting layer of polyurethane has little if any skin thereon. It has been proposed to retard the foaming of these compositions by prechilling the components and the mixture and by use of special delayed action catalysts and the like. Other processes have involved the coating of a suitable support with a foamable polyurethane composition and applying over the polyurethane composition prior to the foaming operation a suitable coating that prevents loss of the carbon dioxide or fluid blowing agent from the flexible foam.

An object of the present invention is to control the formation of a skin over the foamed polyurethane and to make use of the load supporting values of that unblown polyurethane skin as well as of the sponge or blown polyurethane to greatly increase the resistance to deflection of the polyurethane article and to reduce its permanent set.

Another object of the present invention is to provide a carpet underlay which has portions of foamed or sponge polyurethane of different thicknesses and which utilizes convex or arcuately shaped portions of unblown skin as a weight or load supporting member.

It is another object of the present invention to provide a method of preparing load supporting elements having polyurethane foam in thin non-uniform thicknesses or varying heights and utilizing an unblown intricately formed skin as a shaped load supporting element thereof.

It is a further object of the present invention to provide a method of preparing a carpet underlay having spaced portions of polyurethane foam of similar pattern and thicknesses and utilizing an unblown integrally formed skin as a shaped load supporting element thereof.

It is a still further object of the present invention to provide a composite article suitable as a cushioning member having discontinuous shaped portions of polyurethane foam attached to a flexible relatively non-stretchable or difficultly stretchable backing and having the foam protected and reinforced by an unblown integral skin portion having curved or arcuately shaped portions thereof for increasing resistance to deformation.

A further object of the present invention is to provide a cushioning member having polyurethane foam portions of varying but controlled heights attached to a flexible substrate and a method of making same.

Other objects will be apparent from the following description of this invention as illustrated by the accompanying drawings in which:

FIGURE 6 is a schematic side elevational view of suitable apparatus as loaded with flexible backing and suitable for use in preparing the articles of the present invention;

FIGURE 7 is a slightly enlarged and elevational view of a portion of loaded apparatus of FIGURE 6 as seen from the line 7—7 of FIGURE 6, a portion of the flexible backing is removed to show the embossing roll.

FIGURE 8 is a vertical sectional view thru portions of the embossing roll, the flexible backing and associated resilient pressure roll as viewed from a vertical plane thru the line 8—8 of FIGURE 7;

FIGURE 9 is a sectional view on a larger scale than FIGURE 6 through portions of the loaded apparatus of FIGURE 6 showing the doctor blade application, portions of the flexible backing and portions of the embossing roll;

FIGURE 10 is a sectional view on the line 10—10 of FIGURE 7 thru the flexible backing as embossed and removed from the roll;

FIGURE 11 is a sectional view on the line 11—11 of FIGURE 7 thru the flexible backing and removed from the roll.

Figure 1:
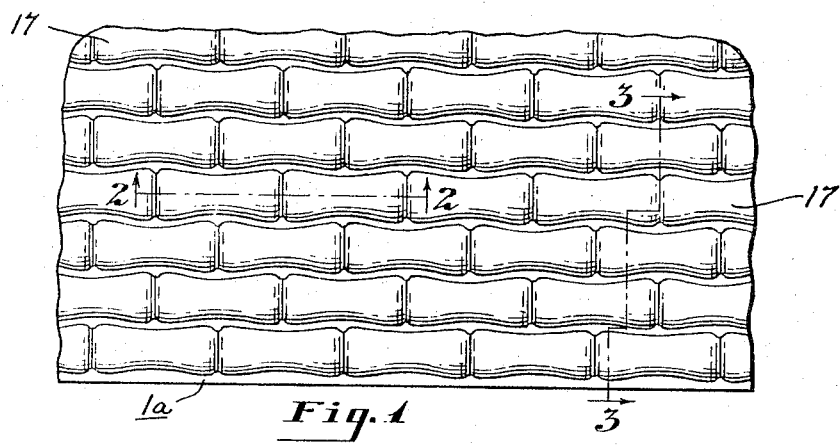
FIGURE 1 is a plan view of a product embodying the present invention.
Figure 2:
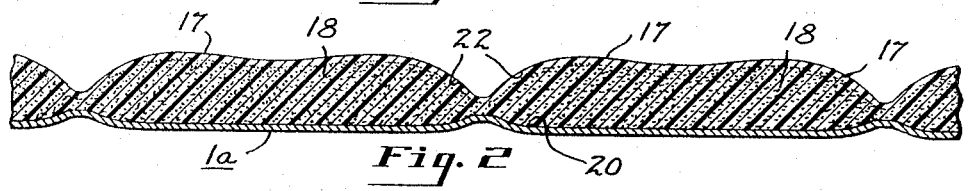
FIGURE 2 is a sectional view on a line 2—2 of FIGURE 1.
Figure 3:
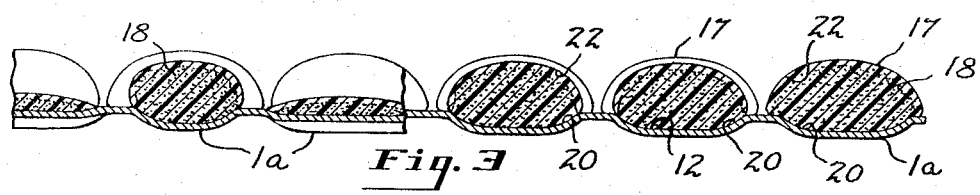
FIGURE 3 is a sectional view on a line 3—3 of FIGURE 1.

In accordance with the present invention, a fluid mixture comprising one or more organic polyols and one or more polyisocyanates in substantial excess of that required for reaction with the hydroxyl groups of said polyols, or a reaction product or prepolymer of one or more suitable polyols and one or more isocyanates having at least two reactive isocyanate groups, which prepolymer preferably has a viscosity of at least 25,000 c.p.s. and has isocyanate end groups or hydroxyl terminated end groups, plus excess polyisocyanate, together with suitable catalysts are disposed on a flexible carrier having embossings thereon of desired shape, and the carrier plus the coating is thereafter subjected to water vapor, preferably nearly saturated water vapor and preferably at somewhat elevated temperatures. The water absorbed or deposited from the vapor reacts in surface portions of the composition to produce a skin on the surface before lower portions are subject to reaction. Vapor absorbed then reacts with lower portions to produce foaming and further polyurethane formation. Loss of gas from lower levels is then prevented. Restated, a liquid polyurethane-forming composition including, for instance, at least one organic polyol and at least one polyisocyanate in substantial molar excess to said polyol are, in liquid form, disposed upon a flexible, embossed backing-member in the depressed portions thereof, and the resulting composite contacted with water vapor at a temperature of 100° to 200° F., preferably from 120° to 180° F., the water being absorbed and condensed from vapor form so that it reacts with the surface portions of the polyurethane-forming liquid composition to form a flexible, unblown, water vapor-permeable, gas-impermeable, preformed polyurethane skin with the evolution of gas such as carbon dioxide before the lower portions are subjected to reaction by introducing steam. The flexible, steam-permeable polyurethane skin must be sufficiently thick that, during the subsequent blowing reaction, the skin does not rupture.

Next, steam, at a temperature below about 350° F., is absorbed through the steam-permeable polyurethane skin and reacts as water vapor with lower portions of the liquid polyurethane-forming composition with the resulting evolution of additional gas from such lower portions and with the retention of this gas by the preformed polyurethane skin. This results in polyurethane foaming between the preformed, unblown skin and the flexible backing-member. The result is a "pocket" containing, for example, $CO_2$ gas with the unblown polyurethane skin being securely bonded to the flexible backing member. The gas is entrapped on the one side by the flexible water vapor-permeable polyurethane skin and on the other side by the flexible backing member with the result that there is high load-bearing capacity per unit of article weight, as will be more fully shown hereinafter. Since the amount of foam depends upon the thickness of the unfoamed material, the height of the foam produced above the upper plane of the flexible backing member will vary in accordance with the depth of the embossings. The polyols may be polyether or polyester polyols as well known in the art which polyols are fluid and have a molecular weight above 600 and preferably above 1000.

Referring more particularly to the drawings wherein like portions are designated by like numerals of reference throughout the several views, the liquid polyurethane-forming composition which is adapted to froth only upon contact with water or vapor thereof is applied to a flexible backing such as paper preferably while said flexible backing is firmly supported at embossed portions of the backing so that suitable wiping pressure may be applied to remove excess material without deforming the embossing. Thus, the backing which may be cloth, paper or other suitable flexible film 1 is obtained from a suitable source such as the roll 2 and is passed between the embossing roll 3 and the resilient pressure roll such as the rubber roll 4. The embossing roll is preferably heated by suitable means such as steam or hot water which may be incorporated into the hollow center thereof through a conventional conduit (not shown) and which may emerge therefrom through another conduit (not shown) as is customary in the art. The temperature of the embossing roll may thus be controlled as desired.

The rubber roll 4 is pressed against the paper, cloth, plastic or other flexible backing 1 by suitable means with such great force such that the paper or backing is permanently deformed into the cavities 5 of the embossing roll. Thus embossed backing is supported by the backing roll which is rotating in the direction of the arrow 6. The fluid polyurethane forming materials 7 as hereinafter described are applied to the embossed backing from the trough 8 having a linear opening 9 in the lower portion thereof. A suitable doctor blade or other wiping member 10 is provided to wipe off excess of the liquid composition and preferably all of that above the topmost elements of the backing member. The embossed backing member 11 containing the foamable urethane composition in depressed portions or cavities 12 thereof is thereupon passed into the tunnel 15 of the conditioning oven 16 which is provided with suitable means (not shown) for incorporation of water vapor or steam at a desired temperature and maintaining desired relative humidity in portions thereof. Upon contact with steam or other water vapor at elevated temperature, the upper portion of the liquid composition reacts forming a dense unblown skin 17 on the surface thereof which acts as a subsequent barrier against loss of $CO_2$ from later reaction. Diffusion of water vapor through the upper layer causes reaction and blowing of the lower layer to form the sponge portions 18. By varying the contour of the depressed portions or cavities 12 in the backing, portions of the urethane foam and skin may be shaped as desired. Thus by having arcuately shaped or curved portions 20 in the depressed portions 12 of the embossed backing, one obtains similarly but inversely or oppositely curved portions 22 in the upper surface of the urethane foam. The backing 1, if it is non-separable from and integral with the polyurethane, is preferably relatively non-stretchable except under heat or conditions for embossing. The unfrothed portions of the urethane arches are, therefore, anchored at their sides so that the arch or dome acts as a spring-like covering for the foamed portion 18. The skin thereby adds great support to the urethane composition.

The temperature of the initial heating in the water vapor is very critical in controlling the nature of the foam and the foam expansion. It is therefore sometimes desired to have the tunnel divided into an initial section A and a subsequent section B through which the embossed backing 1a carrying the liquid (as it enters) or the foam plus skin is passed. In the initial section A the water vapor is condensed onto the surface of the coating. In the subsequent portion B the water content in the coating is maintained while heat is supplied for completion of the urethane-forming reactions. The speed of the embossing roll and of the backing through the tunnel is preferably regulated so that about 30 to 50 seconds is consumed in the initial portion A.

The temperature of the initial portion is as aforesaid very important in controlling foaming expansion of the skin formation. Temperatures of 100° F. to 200° F. have been used, but temperature of 120° F. or above are usually preferred. The foam becomes progressively denser as the temperature is lowered. At around 180 or 185° F. with 100% or saturated relative humidity, a stiff glossy skin is quickly produced. At around 190 to 195° F. with saturated relative humidity, a softer but less smooth skin is produced. When the temperature is raised too high, however, the foam may be partially collapsed, probably because penetration of water is too deep before the tough skin is formed. It is generally preferred with most compositions that the temperature be maintained in the initial zone A below 200° F. In the subsequent portion B, the temperature may be raised substantially to effect a rapid curing of the foam.

The amount of water condensed in the coating determines in substantial measure the compression set properties of the foam. In general, compression set decreases rapidly up to about a 25% water pick-up based on the coating weight, and above 40% water pickup we have found that the compression set increases slowly.

The steam temperature during the balance of the heating cycle in portion B determines in large measure the time required to complete the curing of the urethane composition. For about each 30° F. increase in temperature, it is found that the curing time is reduced about one-half. It is not desirable to use temperatures above 350° F., however, because of adverse effects on the foam. The height of the foam obtainable is in most compositions limited by tendency for tearing of the upper side edges of the foam and skin during final expansion. The tear can, however, be minimized in any given pattern by reducing the temperature during the initial portions of the heating cycle, i.e., time and temperature in portion A, and also by use of larger radii in the embossed pattern.

The formulation of the urethane compositions may be varied widely as is well recognized by those skilled in the art, and, as aforesaid, the compositions all consist essentially of a polyol, preferably a polyether polyol, having three or more hydroxyl groups and a molecular weight above 600, preferably from 1000 to 5000, a catalyst, a cell-controlling ingredient such as a suitable silicone oil and a polyisocyanate, usually a diisocyanate such as toluene diisocyanate or methylene bis-phenylene isocyanate; the isocyanate is present in substantial excess above that capable of reacting with hydroxyl of the polyol and usually is present in sufficient quantity to provide an excess of 10 to 600 percent. It is preferred to first form a water-free prepolymer of the polyol and the isocyanate with a small amount of metallic catalyst such as a tin carboxylate, preferably a stannous carboxylate such as stannous octoate or stannous oleate, or a mixture of such tin carboxylate with an organic lead salt. The prepolymer is then preferably mixed with a pigment to form a premix, and the premix is mixed with the additional isocyanate to produce the coating mix having a substantial excess of isocyanate groups over those that can react with the polyol or with the prepolymer.

While it is usually preferred that the backing remain integral with the urethane, a separable backing may be used. Thus paper or plastic suitably treated to prevent adhesion may be used and the arch-like or dome-shaped foamed material separated from the backing.

The following examples in which parts are by weight illustrate the invention:

*Example I.—Urethane carpet underlay formulation*

A fluid prepolymer is prepared by mixing the following ingredients at room temperature:

| | Parts |
|---|---|
| Niax Triol LG–56 | 100.0 |
| Stannous octoate | 0.2 |
| 80/20 toluene diisocyanate | 4.4 |
| | 104.6 |

The prepolymer had a viscosity (Brookfield #4 Spindle 6 r.p.m.) of 47,000±3,000 c.p.s. at 73° F.

A fluid premix was then prepared by mixing the above prepared prepolymer and the other ingredients in the following proportions:

| | Parts |
|---|---|
| Prepolymer | 50.0 |
| Niax Triol LG–56 | 50.0 |
| Silicone | 1.0 |
| Whiting (filler) | 100.0 |
| Lead naphthenate (24%) | 0.1 |
| Stannous octoate | 0.25 |
| | 201.35 |

The fluid premix had a viscosity (Brookfield #4 Spindle 6 r.p.m.) of 28,000±2,000 c.p.s. at 73° F.

The premix thus prepared was then mixed with additional polyisocyanates in the following proportions to form the coating mix:

| Coating mix: | Parts |
|---|---|
| Premix | 201.35 |
| 80/20 TDI | 35.0 |
| | 236.35 |

The viscosity (Brookfield #4 Spindle 6 r.p.m.), 1 minute after mixing was 3,500±500 c.p.s. at 80° F.

In the above example:

Niax Triol LG–56 is a propylene oxide adduct of glycerol having a hydroxyl No. of 56.

80/20 toluene diisocyanate is an 80/20 mixture of 2–4 and 2–6 toluene diisocyanates.

The silicone used is a silicon block copolymer having the formula:

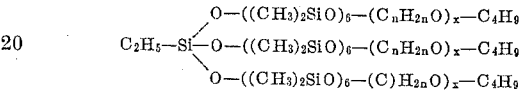

Other silicone block copolymers as shown in Pat. 2,834,-748 and other silicone oils may be substituted for the particular silicone used above.

*Example II*

Figure 4:
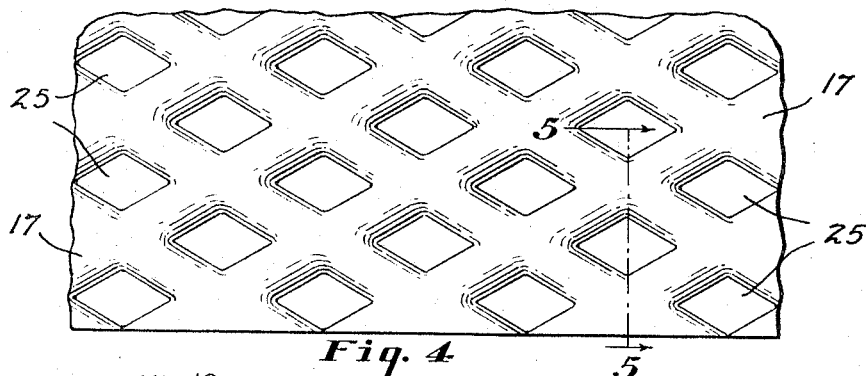
FIGURE 4 is a plan view of a modified form of product embodying the invention.
Figure 5:
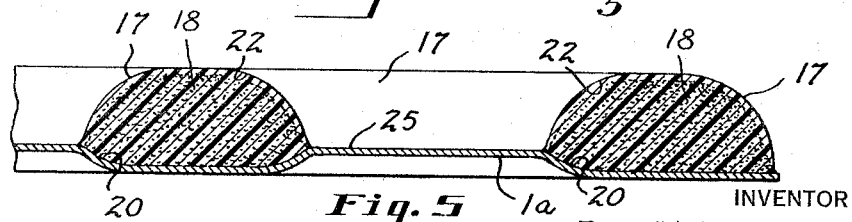
FIGURE 5 is a sectional view on line 5—5 of FIGURE 4.

The coating mix of Example I is placed in the trough 8 of apparatus such as that in FIGURE 6 and spread on a separable backing having a diamond shaped pattern similar to that shown in FIGURES 4 and 5. The material is wiped off the tops 25 of the diamonds by the doctor blade 10. The backing and contained urethane was passed through a zone of 100% relative humidity at 180° F. for 40 seconds, then through a zone at 100% relative humidity at 250° F. for 140 seconds. The backing was separated and the product was compared with a high quality sponge rubber. The results of the comparison are shown in Table I:

TABLE I.—URETHANE CARPET UNDERLAY PROPERTIES
[Obtained on ⅜″ thick diamond pattern without backing]

| | Urethane | Whiteway Sponge Rubber |
|---|---|---|
| Weight (lbs./sq. yd.) | 1.2 | 4.0. |
| Indent Load (p.s.i.): | | |
| 25% Compression | 1.4 | 1.7. |
| 65% Compression | 6.3 | 5.0. |
| Compression Set (50% Compression, 72 hrs. at 158° F.). | 20 | 28. |
| Mobay Wear Test, 100,000 Rev.: | | |
| Percent Ht. Loss | 6 | 0. |
| Percent Indent load loss | 42 | 32. |
| Exposure to Indoor Light: | | |
| 1 Week | Slight yellowing. | Slight yellowing. |
| 1 Month | Yellow | Tan with oxidized crust. |

*Example III*

A fluid prepolymer was prepared of the following composition:

| Prepolymer: | Parts |
|---|---|
| Niax Triol LG–56 | 60.0 |
| Monoethanolamine | 1.5 |
| 80/20 TDI (toluene diisocyanate) | 21.8 |
| Silicone (as in Example I) | 0.5 |

The prepolymer was then compounded as follows to prepare a coating mixture:

| | Parts |
|---|---|
| Prepolymer | 83.8 |
| Niax Triol LG–56 | 40.0 |
| Stannous octoate | 0.5 |
| Whiting (or other powdered filler) | 50.0 |

The mixture was then spread on a non-separable embossed paper backing as described above and the whole treated as in Example II. A product having the foam and skin anchored to the backing was obtained. The upper surfaces of the portions 11 and 25 were uncovered by urethane.

*Example IV*

| | Parts |
|---|---|
| Niax Triol LG–56 | 100.0 |
| L–3 resin | 25.0 |
| Silicone (as in Example I) | 1.5 |
| Whiting (filler) | 65.0 |
| Lead naphthenate | 0.1 |
| Stannous octoate | 0.4 |
| Type 44 molecular sieve | 2.0 |
| 80/20 TDI | 39.0 |

A single shot fluid mixture was prepared of the above materials and spread on an embossed heavy paper backing and passed through the heating chamber for the times and at the temperatures of Example II. A carpet underlay having the paper firmly bonded to the skin covered polyurethane foam was produced.

In the above example L–3 resin is a polypropylene oxide having terminal amino groups and having a molecular weight of about 1000. It is prepared by reacting a polypropylene ether having terminal hydroxyls with acrylonitrile and reducing the cyano groups to amino.

When the composition of Examples III and IV were spread on the separable backing used in Example II and the materials treated as in Example II and the backing separated to obtain a foam of the same ⅜″ thickness, the following properties were obtained:

| Formulation | Examples | |
|---|---|---|
| | No. III | No. IV |
| Weight (lbs./sq. yd.) | 2.1 | 1.4 |
| Indent Load (p.s.i.): | | |
| 25% Compression | 1.1 | 1.1 |
| 65% Compression | 4.2 | 5.7 |
| Compression Set (50% Compression, 72 hrs. at 158° F.) | 27 | 22 |
| Mobay Wear Test, 100,000 Rev.: | | |
| Percent Ht. loss | 0 | 0 |
| Percent Indent load loss | 9 | 32 |
| Material Cost (per sq. yd.) | $.580 | $.415 |

In place of the polyols used in the above examples other suitable polyols may be used including polyesters as well as polyethers.

While it is preferred to have curved side edges on said spaced depressed portions of said backing, articles which are also useful may be produced with straight or even vertical side edges. In some cases it is desirable to fill some of the said depressed portions or cavities in said backing with one foam forming polyurethane formulation and other of said depressed portions or cavities with another formulation so that foamed portions of different densities and heights above the plane of the upper edge portion of said cavities are obtained.

It is to be understood that in accordance with the provisions of the patent statutes, variations and modifications of the specific devices (invention) herein shown and described (for the purposes of illustration) may be made without departing from the spirit of the invention.

What I claim is:

1. A process of forming load supporting polyurethane foam in thin sections, which foam has an integral load supporting skin having portions of a generally arch shaped cross-section, which comprises embossing a suitable flexible backing member to provide spaced depressed portions, filling said depressed portions with a substantially water-free polyurethane-forming liquid composition adapted to react upon contact with water and comprising a member of the group consisting of (1) a mixture of an organic polyol having a molecular weight of at least 600, a polyisocyanate in excess of that required to react with said polyol and suitable catalysts to accelerate the reaction of isocyanate with hydroxyl containing materials, and (2) a liquid prepolymer of such mixture with isocyanate end groups, passing said backing containing said polyurethane-forming liquid composition in said spaced depressed portions through a zone of high humidity at elevated temperature to cause formation of a relatively solid skin on the uncovered surface of said urethane-forming composition and foaming and setting of the remaining material to a resilient flexible polyurethane sponge between said skin and said flexible backing member.

2. The method of claim 1 wherein said spaced depressed portions have curved side edge portions whereby generally arch shaped upper surface is obtained in spaced portions of the polyurethane is foamed.

3. The method of claim 2 wherein the backing is integrally attached to the said polyurethane sponge.

4. A flexible article comprising a flexible foamed polyurethane sponge and an integral flexible backing member having spaced depressed portions embossed therein said depressed portions being filled with said sponge and said sponge extending only above the uppermost edges of said depressed portions, the upper surface only of said polyurethane sponge being covered with an integral skin of relatively solid flexible non-foamed polyurethane.

5. In a process for producing a lightweight non-crusted polyurethane-containing load supporting article, the improvement which comprises applying a liquid polyurethane-forming composition, which is adapted to react when contacted with a member of the group consisting of water and water vapor, to a flexible backing member having a plurality of spaced, depressed portions, passing said backing member containing said liquid polyurethane-forming composition in said depressed portions through a zone containing water vapor at a temperature of about 100° to 200° F. to cause an initial reaction at the exposed surface of said polyurethane-forming composition and produce a steam-permeable, non-foamed, polyurethane skin on the exposed surface of said liquid, said polyurethane skin being sufficient in thickness to retain gas formed during subsequent production of polyurethane sponge from the remainder of said fluid polyurethane-forming composition contained in said depressed portions, then causing reaction of and blowing of the remaining polyurethane-forming liquid composition by contacting said composition with steam at a temperature not in excess of about 350° F., to cause the permeation of water vapor through said gas-retaining, non-foamed polyurethane skin so as to form resilient foamed polyurethane sponge between said non-foamed polyurethane skin and said flexible backing member.

6. The process of claim 5 wherein the liquid polyurethane-forming composition on said flexible backing is admitted to a zone containing water vapor at a temperature of between about 120° to 180° F. and is thereafter charged to a steam-containing zone maintained at a temperature between about 212° to 250° F. to cause the formation of a polyurethane foam between the resilient backing member and the non-foamed polyurethane skin with the simultaneous curing of the resulting polyurethane foam to a non-liquid state.

7. A flexible, relatively thin, polyurethane sponge article having portions spaced from each other and of different height above a base plane, each of said portions having an integral, non-foamed, solid, resilient polyurethane skin defining a first and generally arch-shaped cross section of polyurethane sponge extending above and from said base plane, said article having a second inversely shaped downwardly extending arcuate lower portion of polyurethane sponge which is substantially free of polyurethane skin and which extends below said base plane, said second and inversely shaped lower arcuate portion being generally opposite to said first arch-shaped cross section of polyurethane sponge and being within pockets of embossed non-polyurethane.

References Cited by the Examiner

UNITED STATES PATENTS

| | | | |
|---|---|---|---|
| 2,271,058 | 1/1942 | Binns | 264—171 |
| 2,325,903 | 8/1943 | Blair et al. | 264—47 |
| 2,850,467 | 9/1958 | Livingwood | 264—82 X |
| 2,865,046 | 12/1958 | Bird | 264—47 |
| 2,943,949 | 7/1960 | Petry | 117—11 |

FOREIGN PATENTS 810,095   3/1959   Great Britain.

OTHER REFERENCES

Dombtow, B. A., Polyurethanes, Reinhold Plastics Applications Series, N.Y., Reinhold, 1957, chapter 2, page 25, QD305, A2D6.

EARL M. BERGERT, *Primary Examiner.*

J. J. BURNS, M. L. KATZ, *Assistant Examiners.*